Dec. 12, 1933.  H. C. FISHER ET AL  1,939,492
DUST GUARD
Filed Aug. 8, 1929
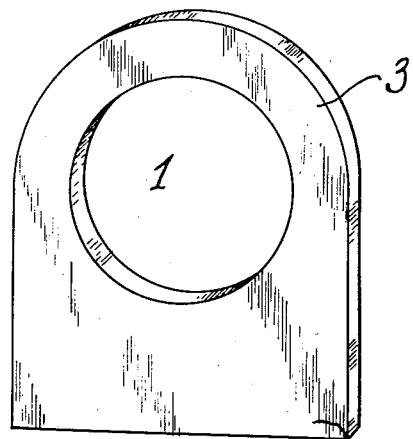
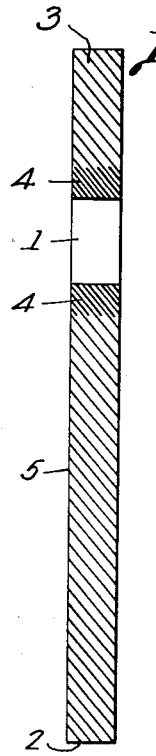
INVENTORS
Harry C. Fisher
Charles L. Keller
BY Allen & Allen
ATTORNEYS.

Patented Dec. 12, 1933

1,939,492

UNITED STATES PATENT OFFICE 1,939,492

DUST GUARD

Harry C. Fisher, Norwood, and Charles L. Keller, Cincinnati, Ohio, assignors to The Richardson Company, Lockland, Ohio, a corporation of Ohio Application August 8, 1929. Serial No. 384,499

2 Claims. (Cl. 286—6)

As is well known, dust guards are used in the compartments provided for the purpose in the journal boxes of railroad rolling stock to prevent dust, pebbles, gravel and various kinds of dirt from getting into the journals of railroad cars through the surfaces of the journal boxes near the wheels. They are, generally speaking, flat shapes, rectangular upon one end and rounded upon the other and having a hole for the passage of the car axle. Our invention is directed to the provision of a new dust guard and a process of making them.

At present dust guards are made by assembling laminations of wood or plies of paper, alone or together, compressing them, and holding them together with clinched pins or rivets. The guard is then die cut to shape and is finished by impregnation and coating with a grease proof saturant. Sometimes the laminations are treated with saturating or coating material before being assembled as described. Present dust guards are expensive not only because of the materials from which they are made but because of the rather complex chain of operations necessary to their manufacture. Considerable waste is incident to dieing them out, and they are, when finished, not entirely satisfactory in many respects.

The primary object of our invention is the provision of a molded dust guard of suitable characteristics, and a composition from which it may be made in a molding operation. Ancillary objects of our invention and a number of advantages flowing from it will be pointed out hereinafter or will be apparent to one skilled in the art upon reading these specifications.

It will be readily appreciated that if dust guards may be made in a molding operation, their initial cost may be greatly diminished not only because the molding operation supplants the complex cutting, coating, riveting and dieing characterizing the old operation, but also because in a molding operation, the wastage of material may be eliminated. Further, a molded dust guard offers the possibility of eliminating the necessity for coating the material with a grease-proof substance, and one of the advantages of our invention is the provision of a formula which makes this possible. Nevertheless there has not hitherto been produced a successful molded dust guard because of the many problems concerned with the manufacture of such articles. Primary requirements of the molded dust guard are flexibility and shatter-proofness at high and low temperatures together with sufficient tensile strength to permit the article to be used without pulling apart. It must have resistance to wear at both high and low temperatures and sufficient resistance to grease and oil to prevent "rotting" when the lubricants used in the journal boxes of railway rolling stock come into contact with them. These qualities are not so easily produced in an integrally molded article as might be supposed because for example, ordinary resistance to wear at high temperatures is opposed by softness of the compound; hardness usually accompanies a decrease in flexibility, etc.

Figure 1 is an elevation of a molded dust guard made with our novel composition. The hole to accommodate the axle of the car is indicated by the numeral 1, the rectangular portion by the numeral 2, and the rounded portion by the numeral 3.

Figure 2 is a cross section of one of our modifications.

Figure 3 is a cross section of another modification.

The numeral 4 indicates the harder of the two portions, and the numeral 5 indicates the softer of the two portions.

We accomplish the objects of our invention in that article and composition of which we shall now describe several preferred embodiments, it being understood that variations may be made in them without departing from the spirit of our invention.

We have discovered that in general the best binder materials to be used in making the dust guards are bituminous materials and of these the most advantageous consist entirely, or are composed in considerable part of fatty acid pitches or the like, commonly called candle tars. In the making of our preferred dust guards we combine such bituminous materials with fibrous material which may vary widely in character. It is advisable to have a considerable percentage of fibrous material, but not all of this need be fibrous material of great fiber length. We have found that cotton dust, which is a refuse from cotton factories, or very short hull fibre, or cleanings from various points in cotton processing, will serve very well as the bulk of the fibrous material, and to it we may add enough fiber of longer length such as cotton linters, jute, paper fibers, etc. to give the required length. There is an advantage in using a portion at least of very short cotton fibre, because more of it can be incorporated than of the longer variety.

An excellent formulæ for use in the manufacture of dust guards has 65% of binder comprising 90% cotton seed pitch and 10% Gilsonite. These binder substances when fluxed together have a ball and ring softening point as described in Abraham: Asphalts and allied substances, third edition, page 687 and following of 230° F., a penetration as described in Abraham: Asphalts and allied substances, pages 664 and following at 77—100—5 of 8, at 115—50—5 of 13, and at 32—200—60 of 6. The formula also has 35% of fibrous material as described above.

We prefer to incorporate fibrous material into the binder in a Warner Pfleiderer type of mixer, Banbury mixer, extrusion machine or any other suitable machine, by eventually bringing the binder to a condition at which it is gummy but not liquid, i. e. adhesive and extensible enough to tedder apart the fibers when the fibrous material is brought in contact with it and the combined mass repeatedly extended in the mixing operation. This is the process described in Patent #1156122 to James C. Woodley and is advantageous in that it produces an individualization of the fibers, a homogeneous intermixing of them with the binder and a distribution of them therethrough, together with a refelting of the fibers in the binder. In the example given, a binder condition conducive to the best type of fiber distribution obtainable with the large fiber content is chosen. Our invention is not, however, limited to this mixing process although we prefer it. Other mixing processes, as when the binder is liquid, may be practiced if desired.

It is not advisable to incorporate fillers in these dust guards because of possible abrasive action, however, in special cases where a filler is desirable, it is preferable to use soft, decomposed silicas, very fine diatomaceous earths or the like rather than gritty materials, so that abrasion, if any, is reduced to a minimum.

The composition of the formula described above when made as described and molded, has a tensile strength at 77° F. of 385 pounds per square inch, while at 22° F. it has a tensile strength of 1166 pounds, per square inch. At room temperature, the material is almost completely shatter-proof while at the extremely low temperature mentioned, it still is tough and resilient and very resistant to shattering forces.

A quantity of compound made as described will be weighed out and placed in a mold where, under the influence of pressure, it will be molded to the desired shape. It will be found that dust guards made of this formula will not only be cheaper than present dust guards but also will have all of the required physical characteristics, accompanied by resistance to softening and disintegration from the effects of lubricants, which latter property is due to the candle tar.

In another exemplary formula we employ a soft stearine pitch which has been hardened by air blowing at an elevated temperature until it has a ball and ring softening point of 236° F., a penetration at 77/100/5 of 2 and at 115/50/5 of 56. This binder may be used with fibrous materials in the same proportion as above and will give a comparable result.

Still another formula satisfactory as to its physical characteristics but exhibiting somewhat less resistance to lubricants than the first two formulæ given above, comprises 57.7% of a binder made up of 20 penetration steam refined Mexican asphalt and Gilsonite in the proportions of 73.7% of the former to 26.3% of the latter. The formula also contains 42.3% of cotton dust containing a percentage of longer fibers. The ball and ring softening point of the composite binder given above is 217° F. with a penetration at 77/100/5 of 4½, and at 115—10005 of 15. The tensile strength of the molded compound at a temperature of 77° F. is around 400 pounds per square inch.

Our guards can be made from a wide variety of materials, and the specific formulæ and materials given above are intended to be exemplary rather than limiting. The combination of shatter resistance at high and low temperatures together with resistance to oil and grease makes the formulæ which comprise candle tar substances of greatest value; but we may use other bituminous substances preferably having a low susceptibility factor, that is to say, a comparatively wide temperature range over which they remain pliable, without becoming either too soft or brittle.

A type of dust guard having a wearing surface much harder than any of the compounds given above but having their advantages can be made by using a hard compound on the wearing surfaces and soft resilient compound for the remainder of the guard. For example, two different compounds are prepared, one such as the first example above, and the second having 85% of a binder with a penetration 77/100/5 of 0, 32/200/60 of 0, 150/100/5 of 15 to 20, and 15% fiber such as cotton linters. A lump of the hard compound and a lump of the soft compound then are placed together in the mold whereupon the application of pressure extrudes one into the other and gives a wearing surface, part of which is hard and protects the softer. Another way of using these two compounds is to mold a circular ring of the harder material, place it in the center of the mold, introduce a mass of the softer compound and form a guard in which the circular wearing surface is hard and the remainder is soft flexible compound. Still another modification is to so position the masses of hard and soft compound that the finished guard will be formed of one or more layers of each.

In such cases where dust guards are molded from bituminous compounds of inferior oil and grease resistance, then it is advisable to coat them with some grease resisting substance.

Having thus described our invention, what we claim as new and desire to secure by Letters Patent is:—

1. A moulded dust guard, a portion of which comprises a composition of approximately 15% fiber and 85% bitumen having substantially no penetration at 32/200/60; another portion comprising a softer composition containing a candle tar substance.

2. A moulded dust guard, a portion of which comprises a composition of approximately 15% fiber and 85% bitumen having substantially no penetration at 32/200/60 and a second portion containing a candle tar substance; said first portion located in the dust guard in a part subjected to wear.

HARRY C. FISHER.
CHARLES L. KELLER.